March 10, 1959 E. M. DISS ET AL 2,877,084
METHOD FOR HEAT TREATING ORIENTED FIBERS OF BLENDED
POLYVINYL CHLORIDE POLYMERS AND CELLULOSE ACETATE
AND PRODUCTS PRODUCED THEREBY
Filed Oct. 14, 1955
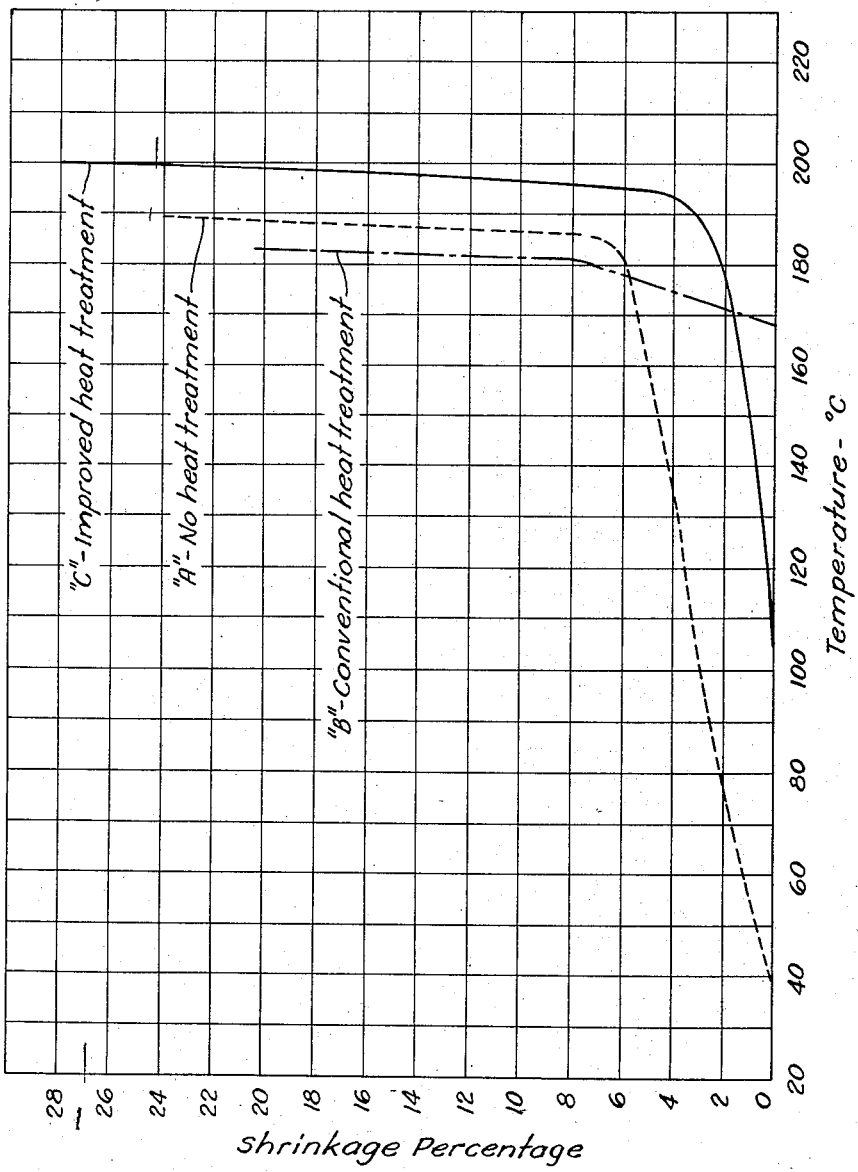
INVENTORS.
Edward M. Diss
Robert R. Walker
BY
Griswold & Burdick
ATTORNEYS

2,877,084

METHOD FOR HEAT TREATING ORIENTED FIBERS OF BLENDED POLYVINYL CHLORIDE POLYMERS AND CELLULOSE ACETATE AND PRODUCTS PRODUCED THEREBY

Edward M. Diss, Sanford, and Robert R. Walker, Midland, Mich., assignors to The Dow Chemical Company, Midland, Mich., a corporation of Delaware Application October 14, 1955, Serial No. 540,570

9 Claims. (Cl. 8—130.1)

This invention relates to a method for heat treating synthetic fibers which consist essentially of a blended resin admixture of vinyl chloride polymers and cellulose acetate and to the product of such heat treatment.

In the copending application of Edward M. Diss and Nelson W. Abernethy, Serial No. 540,647, filed October 14, 1955, there are disclosed, among other things, synthetic fibers consisting essentially of a blended resin admixture of between about 95 and 50 percent by weight, and advantageously between about 80 and 65 percent by weight, of a vinyl chloride polymer, particularly polyvinylchloride, and between about 5 and 50 percent by weight, and advantageously between about 20 and 35 percent by weight of cellulose acetate. While the vinyl chloride polymer in such fibers may sometimes advantageously be a copolymer of vinyl chloride and vinyl acetate containing at least about 80 percent by weight of vinyl chloride in the polymer molecule, it is frequently more advantageous for it to be substantially pure polyvinylchloride. Among other desirable and improved physical characteristics, such fibers have much higher softening points and much lower thermal shrinkage effects than do fibers which are essentially composed of vinyl chloride polymers, particularly polyvinylchloride. As a consequence, such fibers, being better able to withstand ironing and equivalent temperatures when made into fabrics, have greater utility for employment as dimensionally stable textile materials.

Many further improved physical properties and other characteristics may be obtained in such fibers by a heat treating or heat setting operation performed upon them after their preparation in order to relieve at least part of the internal stresses and strains which may be induced in the fibers during orientation and other phases of their manufacture. Such a treatment may be effected in accordance with a conventional and frequently utilized practice by heating the fibers in an inert medium such as air at an elevated temperature for a predetermined interval. For example, a beneficial effect may often be obtained by heating the fibers in air at temperatures between 100° C. and 160° C. for periods of time up to 10 and more minutes. A temperature of about 150° C. for about 7 minutes is frequently quite advantageously employed. Of great significance, such a heat setting of the fibers somewhat improves their heat distortion characteristics in comparison with fibers which receive no heat treatment. While a heat treatment such as described may also improve some of the other properties and characteristics of the fibers, including their abrasion resistance, knot strength and elongation, it has frequently been observed to darken the fiber and also result in undesirably excessive reductions in fiber tenacity.

It would be advantageous, therefore, for an even more beneficial heat treatment or heat setting method to be available for fibers consisting essentially of a blended resin admixture of a vinyl chloride polymer and between about 5 and 50 percent by weight of cellulose acetate in order to obtain products having still further improved physical properties and characteristics, particularly with regard to distortion under the influence of heat, without occasioning such undesirable effects as excessive losses in tenacity and noticeable darkening in the color of the fiber product. Thus, it is among the principal objects of the present invention to accomplish such desiderata.

According to the invention, fibers which consist essentially of a blended resin admixture of a vinyl chloride polymer and between about 5 and 50 percent by weight of cellulose acetate may advantageously be heat treated by first heating the fibers in air while they are in a relaxed and free-to-shrink condition at a temperature between about 125° C. and 150° C. for a period of time between about 30 seconds and 10 minutes until a shrinkage of the fiber occurs which is not in excess of about 5 percent; then subsequently heating the fibers in a non-solvent medium having a slight swelling action on the fibers while they are maintained in a relaxed and free-to-shrink condition at a temperature between about 90° C. and 105° C. for a period of time between about 3 seconds and 10 minutes until a subsequent additional shrinkage of the fibers occurs which is not in excess of about 15 percent.

Preferred heat treating conditions are a temperature of about 140° C. in air for about 5 minutes or such shorter period of time as must not be exceeded to maintain the initial shrinkage of the fibers at not more than about 2½ percent followed by a temperature of about 100° C. in the swelling medium for about 5 minutes or such shorter period of time as must not be exceeded to maintain the subsequent additional shrinkage of the fibers at not more than about 7½ percent. It is preferable for the overall shrinkage of the fibers to be between about 8 and 10 percent as a result of the heat treatment.

Such non-solvent swelling mediums as steam, water and higher aliphatic alcohols containing at least 6 carbon atoms in their molecules may advantageously be employed in the concluding portion of the heat treatment of the present invention. In most instances, water is preferably employed for this purpose.

Blended vinyl chloride polymer-cellulose acetate synthetic fibers exhibit superior resistance to heat distortion when they are heat set according to the heat treating method of the present invention. Frequently the temperature at which a given shrinkage beneath about 6 percent occurs in the heat set fiber is increased by a differential of at least 10 or 15 centigrade degrees. The improvement may be even greater when lesser shrinkages are involved. Consequently, the heat set fibers may advantageously be employed in the construction of fabrics having a better overall dimensional stability. In addition, the present invention provides heat set fibers which have a more improved abrasion resistance, greater knot strength and better elongation than when they are heat set by conventional techniques. Further, their losses in tenacity are not so severe and they are not darkened in appearance but have a lighter or whiter coloration in comparison, which is substantially unchanged from their manufactured appearance.

The present invention may conveniently be illustrated in connection with the drawing which is a graph depicting the typical heat distortion characteristics of three types of fiber samples. Each of the fiber samples was composed of a blended, fiber-forming resin admixture of 72 percent by weight of polyvinylchloride and 28 percent by weight of cellulose acetate. The graph plots the temperature, obtained by immersion of the fibers in a heated mineral oil bath, on the abscicca axis against the percentage of shrinkage observed in the fiber samples on the ordinate axis. The behavior of each of the samples is shown by the curves. Curve "A," on a broken line, represents a fiber sample which was not heat set or heat treated in any manner after its preparation. It is to be noted that shrinkage of this sample began to occur at relatively low temperatures. Although its tenacity was about 2.5 grams per denier, such a fiber is relatively undesirable as a textile material for most purposes due to its poor heat distortion characteristics. A fabric made from such a fiber would tend to have an undesirable dimensional instability. Curve "B," depicted by a broken and dotted line, represents the fiber sample which was heat set in air in a conventional manner at 150° C. for 7 minutes. It had a 6 percent shrinkage at a temperature of less than 180° C. and had a tenacity which was less than 2 grams per denier. It was also in a noticeably darkened condition after being heat set in this manner. Curve "C," drawn in a solid line, represents the behavior of the fiber sample which was heat set, according to the improved heat treating method of the present invention, by being first heated in air for 5 minutes at 140° C. and then being subsequently immersed in boiling water for an additional 5 minutes, all while being maintained in a relaxed, free-to-shrink condition. The tenacity of the fiber was not reduced beneath about 2 grams per denier (which, as is apparent, was at least 8 percent of the tenacity of the untreated fiber) and its color appearance was an undarkened and attractive white which was unchanged from its appearance as manufactured. More important, its heat distortion characteristics were outstanding in comparison to the other fiber samples. At a temperature of about 190° C. the shrinkage of the fiber was only slightly in excess of about 3 percent. A temperature of about 195° C. was required to effect a 6 percent shrinkage in the fiber. Such a fiber finds a greater practical utility as a textile material because of being better adapted to resist distortion from heat and to provide fabrics which are dimensionally stable at such elevated temperatures as are encountered in the conventional ironing and pressing of fabrics.

Analogous results are also obtained in vinyl chloride polymer/cellulose acetate blends of differing compositions. Generally, the heat distortion characteristics of the heat set fiber depend somewhat upon its softening or melting point. Hence, higher melting blends, such as may usually be obtained with increased cellulose acetate content, result in heat set fibers having a higher resistance to heat distortion and shrinkage at any given temperature.

Similar results may also be obtained when such substances as steam or hexanol and the like are substituted for water as the non-solvent swelling medium in the concluding portion of the treatment.

Since certain changes and modifications in the practice of the present invention can readily be entered into without departing substantially from its spirit and scope, it is to be fully understood that all of the foregoing be interpreted as being merely illustrative of certain of the embodiments of the invention.

What is claimed is:

1. Method for heat treating oriented synthetic fibers consisting essentially of a blended resin admixture of between about 95 and 50 percent by weight of a vinyl chloride polymer selected from the group consisting of polyvinyl chloride and copolymers of vinyl chloride and vinyl acetate that contain at least about 80 percent by weight of vinyl chloride polymerized in the polymer molecule and between about 5 and 50 percent by weight of cellulose acetate which comprises first heating the fibers in air while they are in a relaxed, free-to-shrink condition at a temperature between about 125° C. and 150° C. for a period of time between about 30 seconds and 10 minutes until a shrinkage of the fibers occurs which is not in excess of about 5 percent; then heating the fibers in an inert non-solvent medium selected from the group consisting of a higher aliphatic alcohol having at least 6 carbon atoms in its molecule, water and steam, said medium having a slight swelling action on the fibers while they are maintained in a relaxed, free-to-shrink condition at a temperature between about 90° C. and 105° C. for a period of time between about 3 seconds and 10 minutes until a subsequent additional shrinkage of the fibers occurs which is not in excess of about 15 percent.

2. Method for heat treating oriented synthetic fibers consisting essentially of a blended resin admixture of between about 95 and 50 percent by weight of a vinyl chloride polymer selected from the group consisting of polyvinyl chloride and copolymers of vinyl chloride and vinyl acetate that contain at least about 80 percent by weight of vinyl chloride polymerized in the polymer molecule and between about 5 and 50 percent by weight of cellulose acetate which comprises first heating the fibers in air while they are in a relaxed, free-to-shrink condition at a temperature of about 140° C. until a shrinkage of not more than about 2½ percent occurs in the fibers; then heating the fibers in an inert non-solvent medium selected from the group consisting of a higher aliphatic alcohol having at least 6 carbon atoms in its molecule, water and steam, said medium having a slight swelling action on the fibers while they are maintained in a relaxed, free-to-shrink condition at a temperature of about 100° C. until a subsequent additional shrinkage of not more than about 7½ percent occurs in the fibers.

3. The method of claim 2 wherein the fibers consist of a blended resin admixture of between about 80 and 65 percent by weight of said vinyl chloride polymer and between about 20 and 35 percent by weight of cellulose acetate.

4. The method of claim 2 wherein the non-solvent swelling medium is water.

5. Method for heat treating oriented synthetic fibers consisting essentially of a blended resin admixture of about 72 percent by weight of a vinyl chloride polymer selected from the group consisting of polyvinyl chloride and copolymers of vinyl chloride and vinyl acetate that contain at least 80 percent by weight of vinyl chloride polymerized in the polymer molecule and about 28 percent by weight of cellulose acetate which comprises first heating the fibers in air while they are in a relaxed, free-to-shrink condition at a temperature of about 140° C. for a period of time of about 5 minutes; then subsequently heating the fibers in boiling water while they are maintained in a relaxed, free-to-shrink condition for an additional period of time of about 5 minutes.

6. The method of claim 5 wherein the fibers consist of a blended resin admixture of polyvinylchloride and about 28 percent by weight of cellulose acetate.

7. A heat set, oriented synthetic fiber obtained as the product of the process of claim 1, said fiber consisting essentially of a blended resin admixture of (a) between about 72 and 50 percent by weight of a vinyl chloride polymer selected from the group consisting of polyvinyl chloride and copolymers of vinyl chloride and vinyl acetate that contain at least about 80 percent by weight of vinyl chloride polymerized in the polymer molecule and (b) between about 28 and 50 percent by weight of cellulose acetate, said fiber being characterized in (1) having a shrinkage which is less than about 6 percent at temperatures that are between about 10 and 15 centigrade degrees higher than the temperatures at which the same fiber prior to being heat set in the indicated manner undergoes the same shrinkage and (2) having a color that is essentially undarkened from the color of an identical untreated fiber.

8. A heat set, oriented synthetic fiber obtained as the product of the process of claim 1, said fiber consisting essentially of a blended resin admixture of (a) about 72 percent by weight of polyvinyl chloride and (b) between about 28 percent by weight of cellulose acetate, said fiber being characterized in (1) having a shrinkage which is from about 3% at about 190° C. but not in excess of about 6% at temperatures of about 195° C; (2) having a color that is essentially undarkened from the color of an identical untreated fiber; and (3) having a tenacity of at least about 80 percent of the tenacity of an identical untreated fiber.

9. The heat set fiber of claim 8, said fiber being further characterized in having a shrinkage of about 6 percent at temperatures of about 195° C.

References Cited in the file of this patent

UNITED STATES PATENTS

| | | |
|---|---|---|
| 2,161,766 | Rugeley | June 6, 1939 |
| 2,325,060 | Ingersoll | July 27, 1943 |
| 2,346,208 | Conaway | Apr. 11, 1944 |